(12) United States Patent
Edirisooriya et al.

(10) Patent No.: US 8,156,406 B2
(45) Date of Patent: *Apr. 10, 2012

(54) METHOD AND SYSTEM FOR SYNDROME GENERATION AND DATA RECOVERY

(75) Inventors: Samantha J. Edirisooriya, Tempe, AZ (US); Gregory W. Tse, Tempe, AZ (US); Mark A. Schmisseur, Phoenix, AZ (US); Robert L. Sheffield, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1108 days.

This patent is subject to a terminal disclaimer.

(21) Appl. No.: 12/022,009

(22) Filed: Jan. 29, 2008

(65) Prior Publication Data

US 2008/0126907 A1 May 29, 2008

Related U.S. Application Data

(63) Continuation of application No. 11/021,708, filed on Dec. 23, 2004, now Pat. No. 7,343,546.

(51) Int. Cl.
*G11C 29/00* (2006.01)
(52) U.S. Cl. ...................................... 714/770
(58) Field of Classification Search ................ 714/6.21, 714/6.24, 746, 770, 800–801
See application file for complete search history.

(56) References Cited

U.S. PATENT DOCUMENTS

| | | | | |
|---|---|---|---|---|
| 5,099,484 A | * | 3/1992 | Smelser | 714/761 |
| 5,148,432 A | * | 9/1992 | Gordon et al. | 714/6.32 |
| 5,226,043 A | * | 7/1993 | Pughe et al. | 714/768 |
| 5,271,012 A | | 12/1993 | Blaum et al. | |
| 5,499,253 A | | 3/1996 | Lary | |
| 5,579,475 A | | 11/1996 | Blaum et al. | |
| 6,041,431 A | * | 3/2000 | Goldstein | 714/784 |
| 6,247,157 B1 | | 6/2001 | Edirisooriya | |
| 6,567,891 B2 | | 5/2003 | Oldfield et al. | |
| 6,993,701 B2 | * | 1/2006 | Corbett et al. | 714/770 |
| 2005/0050384 A1 | | 3/2005 | Horn | |
| 2005/0108613 A1 | | 5/2005 | Kobayashi | |
| 2006/0123268 A1 | | 6/2006 | Forhan et al. | |

FOREIGN PATENT DOCUMENTS

WO    WO 91/13399    9/1991

OTHER PUBLICATIONS

WO2006/071837 (PCT/US2005/046996) International Search Report, Oct. 24, 2006, Intel Corporation.

(Continued)

*Primary Examiner* — Shelly A Chase
(74) *Attorney, Agent, or Firm* — Blakely, Sokoloff, Taylor & Zafman LLP

(57) ABSTRACT

A method and system for syndrome generation and data recovery is described. The system includes a parity generator coupled to one or more storage devices to generate parity for data recovery. The parity generator includes a first comparator to generate a first parity factor based on data in one or more of the storage devices, a multiplier to multiply data from one or more of the storage devices with a multiplication factor to generate a product, a second comparator coupled to the multiplier to generate a second parity factor based at least in part on the product, and a selector to choose between the first parity factor and the second parity factor.

19 Claims, 4 Drawing Sheets

OTHER PUBLICATIONS

WO2006/071837 (PCT/US2005/046996) International Preliminary Report on Patentability and Written Opinion of the ISR, Jun. 27, 2007, Intel Corporation.

Park, Chan-Ik, "Efficient Placement of Parity and Data to Tolerate Two Disk Failures in Disk Array Systems," IEEE Transactions on Parallel and Distributed Systems, Nov. 1995, vol. 6, No. 11, pp. 1177-1184.

Burkhard, Walter A. et al., "Disk Array Storage System Reliability," IEEE, 1993, pp. 432-441.

Blaum, Mario et al., "EVENODD: An Efficient Scheme for Tolerating Double Disk Failures in RAID Architectures," IEEE Transactions on Computers, Feb. 1995, vol. 44, No. 2, pp. 192-202.

Gibson, Garth A. et al., "Coding Techniques for Handling Failures in Large Disk Arrays," Computer Science Division, Electrical Engineering and Computer Sciences, Berkeley, CA, 1994, pp. 1-29.

Patterson, David A. et al., "A Case for Redundant Arrays of Inexpensive Disks (RAID)," Computer Science Division, Department of Electrical Engineering and Computer Sciences, Berkeley, CA, 1988, pp. 109-116.

USPTO Office Action mailed Jul. 26, 2007; U.S. Appl. No. 11/021,708, filed Dec. 23, 2004; Edirisooriya et al.

Notice of Reasons for Rejection for Japanese Patent Application No. 2007-548571 mailed Dec. 8, 2009, 6 pages (with English Translation).

Official Communication for European Patent Application No. 05855538.4 mailed Sep. 27, 2007, 5 pages.

First Office Action for Chinese Patent Application No. 200580044090.3, 11 pages (with English Translation).

Second Office Action for Chinese Patent Application No. 200580044090.3 mailed May 7, 2010, 6 pages (with English Translation).

* cited by examiner

Table 200

| $g_j^{i+8}$ | i=1 | i=2 | i=3 | i=4 | i=5 | i=6 | i=7 | i=8 |
|---|---|---|---|---|---|---|---|---|
| j=0 | 00000010 | 00000100 | 00001000 | 00010000 | 00100000 | 01000000 | 10000000 | 00011101 |
| j=1 | 00111010 | 01110100 | 11101000 | 11001101 | 10000111 | 00010011 | 00100110 | 01001100 |
| j=2 | 10011000 | 00101101 | 01011010 | 10110100 | 01110101 | 11101010 | 11001001 | 10001111 |
| j=3 | 00000011 | 00000110 | 00001100 | 00011000 | 00110000 | 01100000 | 11000000 | 10011101 |
| j=4 | 00100111 | 01001110 | 10011100 | 00100101 | 01001010 | 10010100 | 00110101 | 01101010 |
| j=5 | 11010100 | 10110101 | 01110111 | 11101110 | 11000001 | 10011111 | 00100011 | 01000110 |
| j=6 | 10001100 | 00000101 | 00001010 | 00010100 | 00101000 | 01010000 | 10100000 | 01011101 |
| j=7 | 10111010 | 01101001 | 11010010 | 10111001 | 01101111 | 11011110 | 10100001 | 01011111 |
| j=8 | 10111110 | 01100001 | 11000010 | 10011001 | 00101111 | 01011110 | 10111100 | 01100101 |
| j=9 | 11001010 | 10001001 | 00001111 | 00011110 | 00111100 | 01111000 | 11110000 | 11111101 |
| j=100 | 11100111 | 11010011 | 10111011 | 01101011 | 11010110 | 10110001 | 01111111 | 11111110 |
| j=11 | 11100001 | 11011111 | 10100011 | 01011011 | 10110110 | 01110001 | 11100010 | 11011001 |
| j=12 | 10101111 | 01000011 | 10000110 | 00010001 | 00100010 | 01000100 | 10001000 | 00001101 |
| j=13 | 00011010 | 00110100 | 01101000 | 11010000 | 10111101 | 01100111 | 11001110 | 10000001 |
| j=14 | 00011111 | 00111110 | 01111100 | 11111000 | 11101101 | 11000111 | 10010011 | 00111011 |
| j=15 | 01110110 | 11101100 | 11000101 | 10010111 | 00110011 | 01100110 | 11001100 | 10000101 |
| j=16 | 00010111 | 00101110 | 01011100 | 10111000 | 01101101 | 11011010 | 10101001 | 01001111 |
| j=17 | 10011110 | 00100001 | 01000010 | 10000100 | 00010101 | 00101010 | 01010100 | 10101000 |
| j=18 | 01001101 | 10011010 | 00101001 | 01010010 | 10100100 | 01010101 | 10101010 | 01001001 |
| j=19 | 10010010 | 00111001 | 01110010 | 11100100 | 11010101 | 10110111 | 01110011 | 11100110 |
| j=20 | 11010001 | 10111111 | 01100011 | 11000110 | 10010001 | 00111111 | 01111110 | 11111100 |
| j=21 | 11100101 | 11010111 | 10110011 | 01111011 | 11110110 | 11110001 | 11111111 | 11100011 |
| j=22 | 11011011 | 10101011 | 01001011 | 10010110 | 00110001 | 01100010 | 11000100 | 10010101 |
| j=23 | 00110111 | 01101110 | 11011100 | 10100101 | 01010111 | 10101110 | 01000001 | 10000010 |
| j=24 | 00011001 | 00110010 | 01100100 | 11001000 | 10001101 | 00000111 | 00001110 | 00011100 |
| j=25 | 00111000 | 01110000 | 11100000 | 11011101 | 10100111 | 01010011 | 10100110 | 01010001 |
| j=26 | 10100010 | 01011001 | 10110010 | 01111001 | 11110010 | 11111001 | 11101111 | 11000011 |
| j=27 | 10011011 | 00101011 | 01010110 | 10101100 | 01000101 | 10001010 | 00001001 | 00010010 |
| j=28 | 00100100 | 01001000 | 10010000 | 00111101 | 01111010 | 11110100 | 11110101 | 11110111 |
| j=29 | 11110011 | 11111011 | 11101011 | 11001011 | 10001011 | 00001011 | 00010110 | 00101100 |
| j=30 | 01011000 | 10110000 | 01111101 | 11111010 | 11101001 | 11001111 | 10000011 | 00011011 |
| j=31 | 00110110 | 01101100 | 11011000 | 10101101 | 01000111 | 10001110 | 00000001 | 11011101 |

FIG. 2

METHOD AND SYSTEM FOR SYNDROME GENERATION AND DATA RECOVERY

CROSS REFERENCE TO RELATED APPLICATIONS

The instant application is a continuation application of, and claims priority under 35 USC §120 to, U.S. patent application Ser. No. 11/021,708, filed Dec. 23, 2004.

TECHNICAL FIELD

Embodiments of the invention relate to syndrome generation and data recovery, and more specifically to PQ RAID syndrome generation and data recovery.

BACKGROUND

With the increase in use of large-scale storage systems, such as with Fiber Channel and Gigabit Ethernet systems, there is an increase in the susceptibility of these systems to multiple disk failures. The rapid growth of disk capacity also prolongs the disk recovery time in the event of disk failures. This prolonged recovery time increases the probability of subsequent disk failures during the reconstruction of user data and parity information stored in a faulty disk. In addition, latent sector failures caused by data that was left unread for a long period of time may prevent data recovery after a disk failure that results in loss of data. The use of less expensive disks, such as ATA (Advanced Technology Attachment) disks, in arrays where high data integrity is required also increases the probability of such disk failures.

RAID (Redundant Array of Independent Disks) architectures have been developed to allow recovery from disk failures. Typically, the XOR (Exclusive-OR) of data from a number of disks is maintained on a redundant disk. In the event of a disk failure, the data on the failed disk is reconstructed by XORing the data on the surviving disks. The reconstructed data is written to a spare disk. However, data will be lost if the second disk fails before the reconstruction is complete. Traditional disk arrays that protect the loss of no more than one disk are inadequate for data recovery, especially for large-scale storage systems.

BRIEF DESCRIPTION OF THE DRAWINGS

The invention is illustrated by way of example, and not by way of limitation, in the figures of the accompanying drawings in which like reference numerals refer to similar elements.

FIG. 2 is a table of example values for a Galois field.

DETAILED DESCRIPTION

Embodiments of a system and method for syndrome generation and data recovery are described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
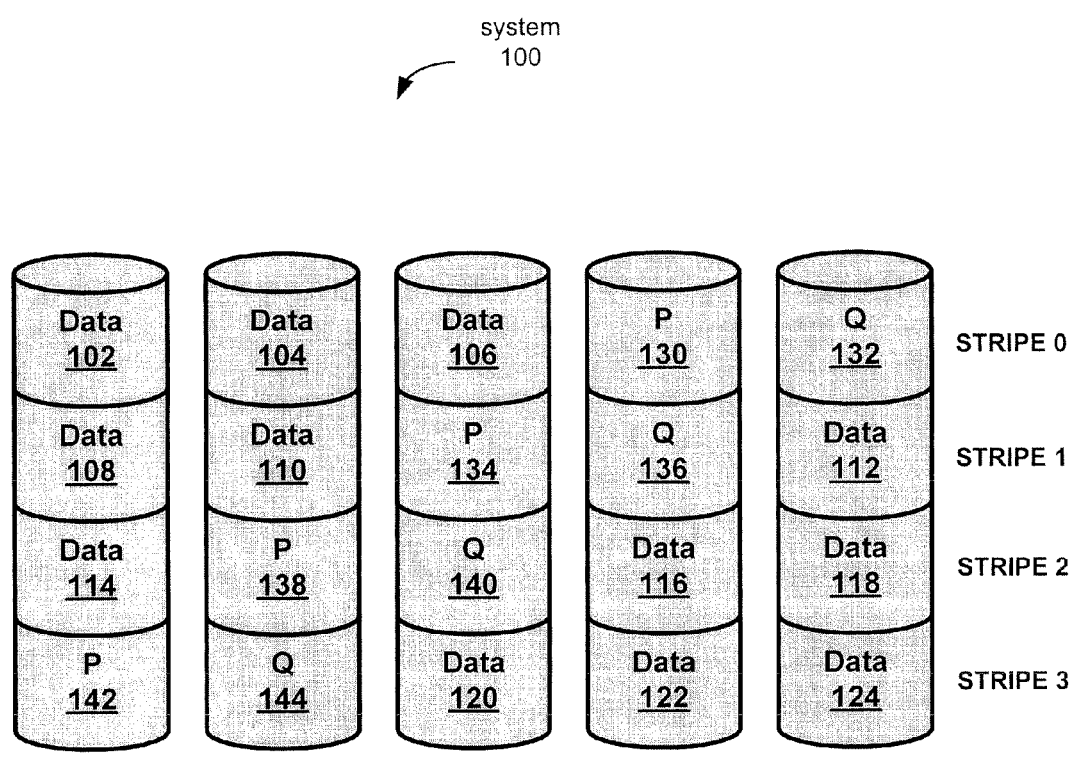
FIG. 1 is a block diagram illustrating a system that allows for recovery from multiple disk failures.

Referring to FIG. 1, a block diagram illustrates a system 100 that allows for recovery from multiple disk failures. The system 100 includes one or more storage blocks for storing data, such as 102-124, and two or more storage blocks for storing parity or syndrome information, such as 130-144. In one embodiment, the system 100 is a RAID (Redundant Array of Independent Disks) system. In one embodiment, two syndromes are generated and stored: P syndrome and Q syndrome. The P syndrome is generated by computing parity across a stripe. The Q syndrome is generated by using Galois Field multiplication. The regeneration scheme for data recovery uses both Galois Field multiplication and division.

The following are the equations for generating P and Q for a storage array with n data disks and two check disks:

$$P = D_0 \oplus D_1 \oplus D_2 \ldots \oplus D_{n-1} \quad \text{(Equation 1)}$$

$$Q = g^0 * D_0 \oplus g^1 * D_1 \oplus g^2 * D_2 \ldots \oplus g^{n-1} * D_{n-1} \quad \text{(Equation 2)}$$

P is the simple parity of data (D) computed across a stripe using $\oplus$ (XOR) operations. Q requires multiplication (*) using a Galois Field multiplier (g).

The following equations show the generation of P and Q when updating a data block $D_a$:

$$P(\text{new}) = P(\text{old}) \oplus D_a(\text{old}) \oplus D_a(\text{new})$$

$$Q(\text{new}) = Q(\text{old}) \oplus g^a * D_a(\text{old}) \oplus g^a * D_a(\text{new}).$$

There are four cases of multiple disk failure that require recovery. In case one, P and Q fail. In this case, P and Q may be regenerated using Equations 1 and 2 shown above.

In case two, Q and a data disk ($D_a$) fail. In this case, $D_a$ may be regenerated using P and the remaining data disks via Equation 1. Q may then be regenerated using Equation 2.

In case three, P and a data disk ($D_a$) fail. In this case, $D_a$ may be regenerated using Q, the remaining data disks, and the following equation:

$$D_a = (Q \oplus Q_a) * g^{-a} = (Q \oplus Q_a) * g^{255-a}, \text{ where}$$

$$Q_a = g^0 D_0 \oplus g^1 D_1 \oplus \ldots \oplus g^{a-1} D_{a-1} \oplus g^{a+1} D_{a+1} \ldots \oplus g^{n-1} D_{n-1}.$$

After $D_a$ is regenerated, P may be regenerated using Equation 1.

In case four, two data disks ($D_a$ and $D_b$) fail. In this case, $D_a$ and $D_b$ may be regenerated using P and Q, the remaining data disks, and the following equations:

$$D_a = (g^{-a} * (Q \oplus Q_{ab}) \oplus g^{b-a} * (P \oplus P_{ab})) / (g^{b-a} \oplus 00000001)$$

$$D_b = D_a \oplus (P \oplus P_{ab}), \text{ where}$$

$$P_{ab} = D_0 \oplus D_1 \oplus \ldots \oplus D_{a-1} \oplus D_{a+1} \ldots \oplus D_{b-1} \oplus D_{b+1} \ldots \oplus D_{n-1}$$

$$Q_{ab} = g^0 D_0 \oplus g^1 D_1 \oplus \ldots \oplus g^{a-1} D_{a-1} \oplus g^{a+1} D_{a+1} \ldots \oplus g^{b-1} D_{b-1} \oplus g^{b+1} D_{b+1} \ldots \oplus g^{n-1} D_{n-1}.$$

The following are examples of recovery from disk failures in the cases described above. In the following examples, the datapath is assumed to be one byte or 8 bits wide. Therefore, a Galois Field, GF ($2^8$) is used. The invention may be implemented for datapaths that are more or less than one byte wide, and larger or smaller Galois fields may be used.

The following equations may be used for multiplying two 8-bit elements (b and c) to yield an 8-bit product (a).

b=[b7 b6 b5 b4 b3 b2 b1 0] and c=[c7 c6 c5 c4 c3 c2 c1 c0].

$a0 = b0 \cdot c0 \oplus b7 \cdot c1 \oplus b6 \cdot c2 \oplus b5 \cdot c3 \oplus b4 \cdot c4 \oplus b3 \cdot c5 \oplus b7 \cdot c5 \oplus$
$b2 \cdot c6 \oplus b7 \cdot c6 \oplus b6 \cdot c6 \oplus b1 \cdot c7 \oplus b7 \cdot c7 \oplus b6 \cdot c7 \oplus b5 \cdot c7$ $a1 = b1 \cdot c0 \oplus b0 \cdot c1 \oplus b7 \cdot c2 \oplus b6 \cdot c3 \oplus b5 \cdot c4 \oplus b4 \cdot c5 \oplus b3 \cdot c6 \oplus$
$b7 \cdot c6 \oplus b2 \cdot c7 \oplus b7 \cdot c7 \oplus b6 \cdot c7$ $a2 = b2 \cdot c0 \oplus b1 \cdot c1 \oplus b7 \cdot c1 \oplus b0 \cdot c2 \oplus b6 \cdot c2 \oplus b7 \cdot c3 \oplus b5 \cdot c3 \oplus$
$b6 \cdot c4 \oplus b4 \cdot c4 \oplus b5 \cdot c5 \oplus b3 \cdot c5 \oplus b7 \cdot c5 \oplus b2 \cdot c6 \oplus b7 \cdot c6 \oplus$
$b6 \cdot c6 \oplus b4 \cdot c6 \oplus b1 \cdot c7 \oplus b3 \cdot c7 \oplus b6 \cdot c7 \oplus b5 \cdot c7$ $a3 = b3 \cdot c0 \oplus b2 \cdot c1 \oplus b7 \cdot c1 \oplus b1 \cdot c2 \oplus b7 \cdot c2 \oplus b6 \cdot c2 \oplus b0 \cdot c3 \oplus$
$b6 \cdot c3 \oplus b5 \cdot c3 \oplus b7 \cdot c4 \oplus b5 \cdot c4 \oplus b4 \cdot c4 \oplus b6 \cdot c5 \oplus b4 \cdot c5 \oplus$
$b3 \cdot c5 \oplus b7 \cdot c5 \oplus b2 \cdot c6 \oplus b6 \cdot c6 \oplus b5 \cdot c6 \oplus b3 \cdot c6 \oplus b2 \cdot c7 \oplus$
$b4 \cdot c7 \oplus b1 \cdot c7 \oplus b5 \cdot c7$ $a4 = b4 \cdot c0 \oplus b3 \cdot c1 \oplus b7 \cdot c1 \oplus b2 \cdot c2 \oplus b7 \cdot c2 \oplus b6 \cdot c2 \oplus b1 \cdot c3 \oplus$
$b7 \cdot c3 \oplus b6 \cdot c3 \oplus b5 \cdot c3 \oplus b0 \cdot c4 \oplus b6 \cdot c4 \oplus b5 \cdot c4 \oplus b4 \cdot c4 \oplus$
$b5 \cdot c5 \oplus b4 \cdot c5 \oplus b3 \cdot c5 \oplus b2 \cdot c6 \oplus b4 \cdot c6 \oplus b3 \cdot c6 \oplus b1 \cdot c7 \oplus$
$b7 \cdot c7 \oplus b2 \cdot c7 \oplus b3 \cdot c7$ $a5 = b5 \cdot c0 \oplus b4 \cdot c1 \oplus b3 \cdot c2 \oplus b7 \cdot c2 \oplus b2 \cdot c3 \oplus b7 \cdot c3 \oplus b6 \cdot c3 \oplus$
$b1 \cdot c4 \oplus b7 \cdot c4 \oplus b6 \cdot c4 \oplus b5 \cdot c4 \oplus b0 \cdot c5 \oplus b6 \cdot c5 \oplus b5 \cdot c5 \oplus$
$b4 \cdot c5 \oplus b5 \cdot c6 \oplus b4 \cdot c6 \oplus b3 \cdot c6 \oplus b2 \cdot c7 \oplus b4 \cdot c7 \oplus b3 \cdot c7$ $a6 = b6 \cdot c0 \oplus b \cdot c1 \oplus b4 \cdot c2 \oplus b3 \cdot c3 \oplus b7 \cdot c3 \oplus b2 \cdot c4 \oplus b7 \cdot c4 \oplus$
$b6 \cdot c4 \oplus b1 \cdot c5 \oplus b7 \cdot c5 \oplus b6 \cdot c5 \oplus b5 \cdot c5 \oplus b0 \cdot c6 \oplus b6 \cdot c6 \oplus$
$b5 \cdot c6 \oplus b4 \cdot c6 \oplus b5 \cdot c7 \oplus b4 \cdot c7 \oplus b3 \cdot c7$ $a7 = b7 \cdot c0 \oplus b6 \cdot c1 \oplus b5 \cdot c2 \oplus b4 \cdot c3 \oplus b3 \cdot c4 \oplus b7 \cdot c4 \oplus b2 \cdot c5 \oplus$
$b7 \cdot c5 \oplus b6 \cdot c5 \oplus b1 \cdot c6 \oplus b7 \cdot c6 \oplus b6 \cdot c6 \oplus b5 \cdot c6 \oplus b0 \cdot c7 \oplus$
$b6 \cdot c7 \oplus b5 \cdot c7 \oplus b4 \cdot c7$ FIG. 2 shows a table 200 providing example values of the Galois field multiplier $g^a$ for g=0000 0010. The negative power of a generator for GF($2^8$) can be computed using the following equation:

$$g^{-a} = g^{255-a}.$$

The following example shows how to generate P and Q parity for a disk array with four data disks and two parity disks. Assume that each data block contains one data byte. Let $D_i$ be the data contain in disk I (i=0,1,2,3). Consider the following data stripe:

$D_0$=1011 0100, $D_1$=0010 1100, $D_2$=1000 1110 and $D_3$=1101 0101.

Then, P may be generated using Equation 1 as follows:

$$P = D_0 \oplus D_1 \oplus D_2 \oplus D_3$$
$$= 1011\ 0100 \oplus 0010\ 1100 \oplus 1100\ 0110 \oplus 1101\ 0101$$
$$= 1000\ 1011.$$

Q may be generated using Equation 2 as follows:

$$Q = g^0 D_0 \oplus g^1 D_1 \oplus g^2 D_2 \oplus g^3 D_3.$$

From the table in FIG. 2, $g^0$=0000 0001, $g^1$=0000 0010, $g^2$=0000 0100, and $g^3$=0000 1000.

$$\text{Therefore, } Q = 0000\ 0001 * 1011\ 0100 \oplus 0000\ 0010 * 0010\ 1100 \oplus$$
$$0000\ 0100 * 1100\ 0110 \oplus 0000\ 1000 * 1101\ 0101$$
$$= 1011\ 0100 \oplus 0101\ 1000 \oplus 0011\ 1111 \oplus 1110\ 0110$$
$$= 0011\ 0101.$$

The following example shows how to recover from two disk failures using the array generated above. In the first case, P and Q fail. In this case, P and Q are regenerated using Equations 1 and 2 as shown above. In the second case, Q and a data disk ($D_a$) fail. In this case, $D_a$ may be regenerated using P and the remaining data disks via Equation 1. Q may then be regenerated using Equation 2. In the third case, P and a data disk ($D_a$) fail. In this case, $D_a$ may be regenerated using Q, the remaining data disks, and the following equation:

$$D_a = (Q \oplus Q_a) * g^{-1} = (Q \oplus Q_a) * g^{255-a}, \text{ where}$$

$$Q_a = g^0 D_0 \oplus g^1 D_1 \oplus \ldots \oplus g^{a-1} D_{a-1} \oplus g^{a+1} D_{a+1} \ldots$$
$$\oplus g^{n-1} D_{n-1}.$$

For example, suppose disk 2 fails. Then, $$D_2 = (Q \oplus Q_2) \cdot g^{253} = (Q \oplus g^0 D_0 \oplus g^1 D_1 \oplus g^3 D_3) \cdot g^{253}$$
$$= \begin{pmatrix} 0011\ 0101 \oplus 0000\ 0001 * 1011\ 0100 \oplus 0000\ 0010 * \\ 0010\ 1100 \oplus 0000\ 1000 \end{pmatrix} * g^{253}$$

Using the table in FIG. 2, $g^{253}$=0100 0111. Therefore, $$D_2 = (0011\ 0101 \oplus 1011\ 0100 \oplus 0101\ 1000 \oplus 1110\ 0110) *$$
$$0100\ 0111$$
$$= 0011\ 1111 * 0100\ 0111$$
$$= 1100\ 0110.$$

P may then be regenerated using Equation 1, since all data blocks are now available.

In the fourth case, two data disks ($D_a$ and $D_b$) fail. In this case, $D_a$ and $D_b$ may be regenerated using P and Q, the remaining data disks, and the following equations:

$$D_a = (g^{-a} * (Q \oplus Q_{ab}) \oplus g^{b-a} * (P \oplus P_{ab}))/(g^{b-a} \oplus 0000\ 0001)$$

$$D_b = D_a \oplus (P \oplus P_{ab}), \text{ where}$$

$$P_{ab} = D_0 \oplus D_1 \oplus \ldots \oplus D_{a-1} \oplus D_{a+1} \ldots \oplus D_{b-1} \oplus D_{b+1} \ldots$$
$$\oplus D_{n-1}$$

$$Q_{ab} = g^0 D_0 \oplus g^1 D_1 \oplus \ldots \oplus g^{a-1} D_{a-1} \oplus g^{a+1} D_{a+1} \ldots$$
$$\oplus g^{b-1} D_{b-1} \oplus g^{b+1} D_{b+1} \ldots \oplus g^{n-1} D_{n-1}.$$

For example, assume that disks 1 and 3 failed. Then, $$D_1 = (g^{-1} \cdot (Q \oplus Q_{13}) \oplus g^{3-1} * (P \oplus P_{13}))/(g^{3-1} \oplus 0000\ 0001)$$
$$= (g^{254} * (Q \oplus Q_{13}) \oplus g^2 * (P \oplus P_{13}))/(g^2 \oplus 0000\ 0001)$$

$$Q \oplus Q_{13} = 0011\ 0101 \oplus 0000\ 0001 * 1011\ 0100 \oplus 0000\ 0100 *$$
$$1100\ 0110$$
$$= 0011\ 0101 \oplus 1011\ 0100 \oplus 0011\ 1111 = 1011\ 1110$$
$$P \oplus P_{13} = 1000\ 1011 \oplus 1011\ 0100 \oplus 1100\ 0110 = 1111\ 1001$$

From the table in FIG. 2, $g^{254}=1000\ 1110$ and $g^2=0000\ 0100$. Therefore, $$D_1 = ((1000\ 1110 * 1011\ 1110) \oplus (0000\ 0100 * 1111\ 1001))/$$
$$(0000\ 0100 \oplus 0000\ 0001)$$
$$= (0101\ 1111 \oplus 1100\ 0011)/(0000\ 0101)$$
$$= (1011\ 1100)/(0000\ 0101)$$
$$= 0010\ 1100.$$
$$D_3 = D_1 \oplus (P \oplus P_{13})$$
$$= 0010\ 1100 \oplus 1111\ 1001$$
$$= 1101\ 0101.$$

Figure 3:
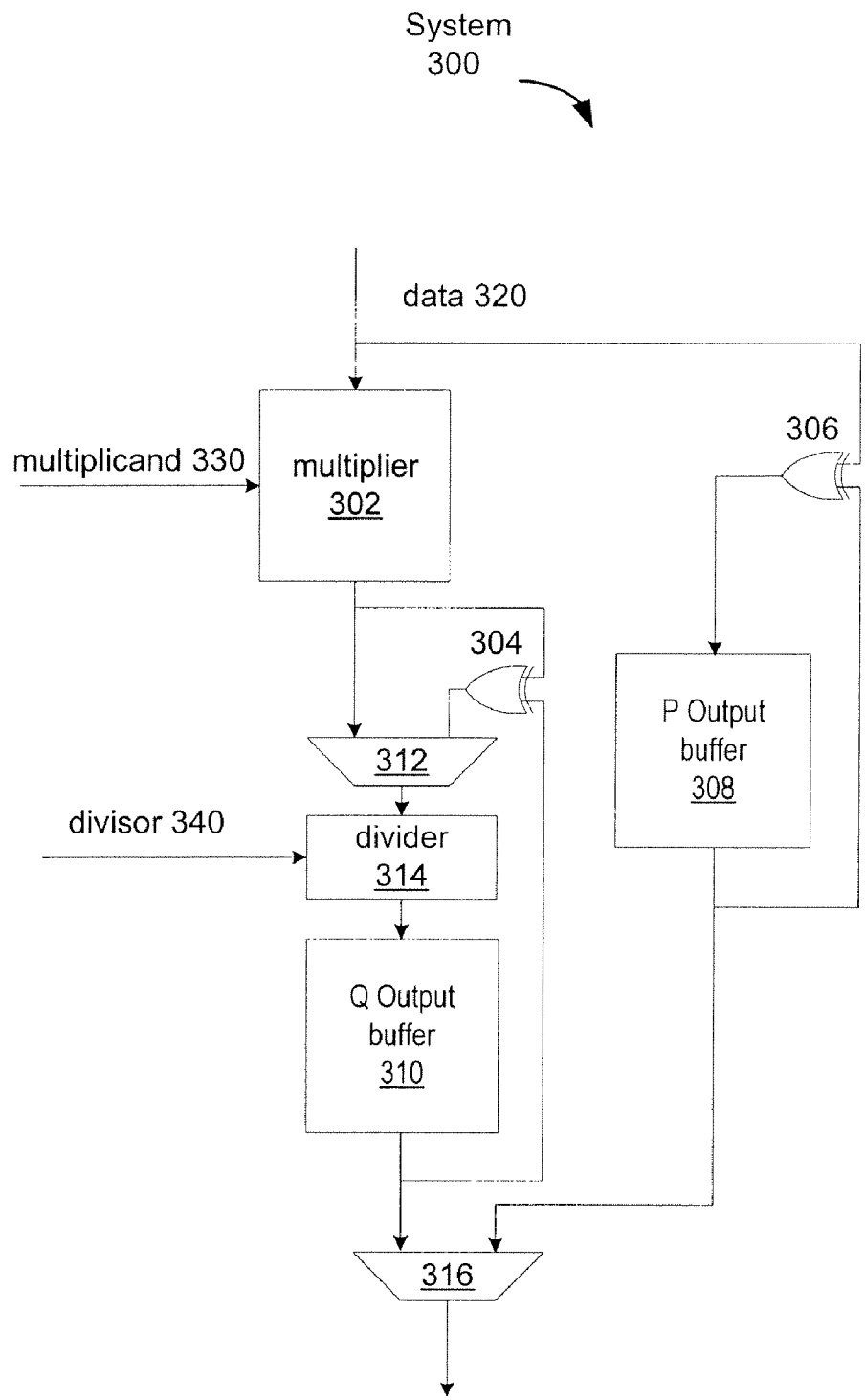
FIG. 3 is a block diagram illustrating a system according to an embodiment of the invention.

FIG. 3 is a block diagram of a system 300 according to an embodiment of the invention. System 300 includes a multiplier 302 and one or more comparators, such as 304 and 306. In one embodiment, one or more of the comparators are XOR (Exclusive-OR) gates. System 300 may also include one or more buffers, such as 308 and 310. The buffer 308 stores the output from the comparator 306. The comparator 306 compares the data 320 read from the storage blocks shown in FIG. 1 with the output of buffer 308. In this way, the comparator 306 may be used to compute the P syndrome described above, which is the parity across a stripe.

The multiplier 302 multiplies the multiplicand 330 with the data 320 read from the storage blocks shown in FIG. 1. In one embodiment, the multiplicand 330 is a Galois field, such as shown in Table 200 of FIG. 2. The output of the multiplier 302 is compared to the output of the buffer 310 by comparator 304. In this way, a Galois field multiplication may be performed and the Q syndrome may be computed. The multiplier 302 may also be used to perform the various multiplication operations for the equations described above with respect to the four cases in which multiple disks fail. Data may be allowed to pass through the multiplier by setting the multiplicand 330 equal to one. A selector 312 may be used to select between the output of the multiplier 302 and the output of the comparator 304. In one embodiment, the selector 312 is a multiplexer (MUX).

System 300 may also include a divider 314 to be used to perform the division operations for the equations described above with respect to the four cases in which multiple disks fail. For example, in case four, the computation for regeneration of $D_a$ has a division operation, which may be performed by divider 314. Data may be allowed to pass through the divider 314 by setting the divisor 340 equal to one. This may be desired when no division operation is required to be performed.

As shown in FIG. 3, the system 300 performs the generation of the P and Q syndromes in parallel. Other multiplication and division operations that are required may also be performed by system 300. A selector 316 may be used to select the desired output of the system. In one embodiment, the selector 316 is a multiplexer (MUX).

Figure 4:
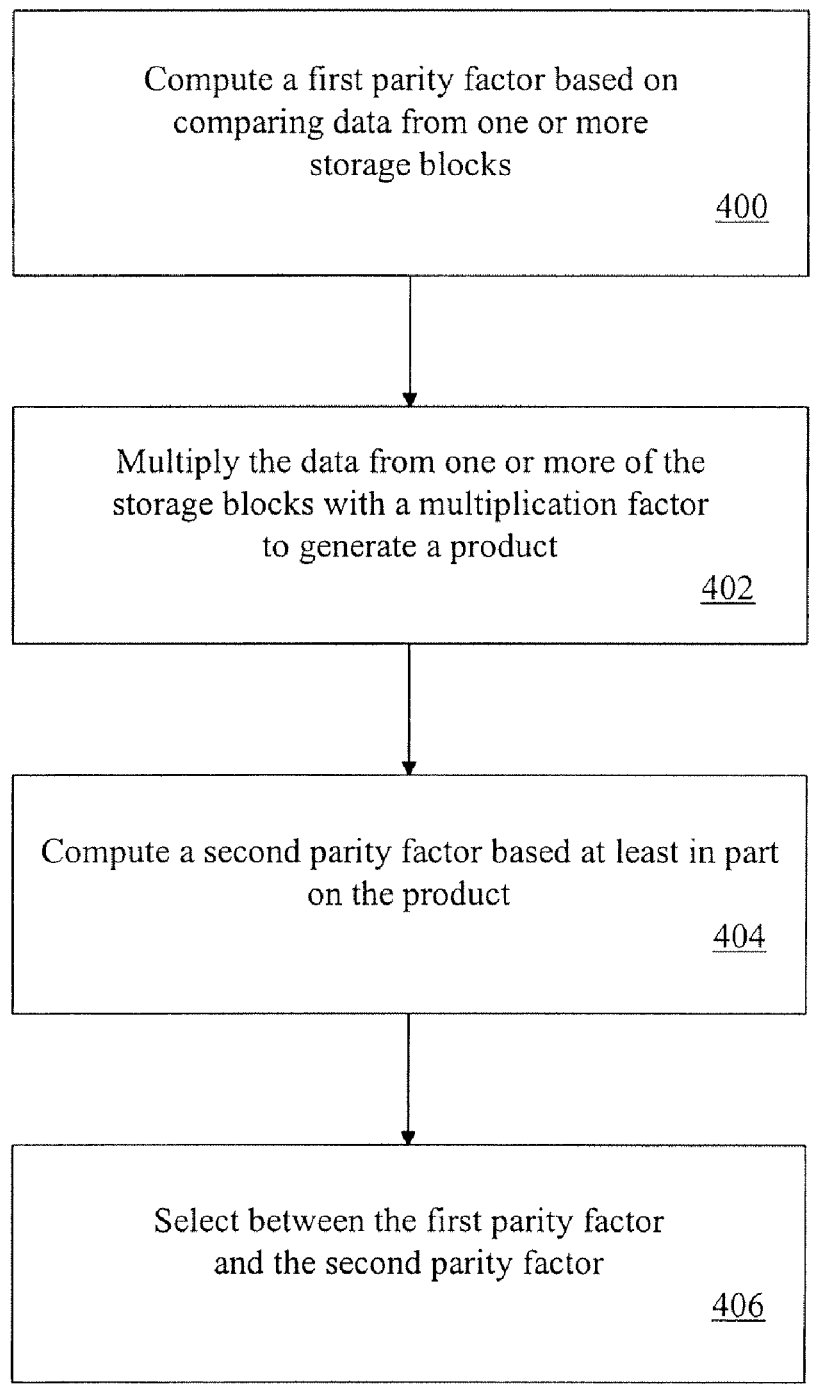
FIG. 4 is a flow diagram illustrating a method according to an embodiment of the invention.

FIG. 4 illustrates a method for generating parity to aid in the recovery of data in one or more storage blocks according to one embodiment of the invention. At 400, a first party factor is computed based on comparing data from one or more of the storage blocks. At 402, the data from one or more of the storage blocks is multiplied with a multiplication factor to generate a product. At 404, a second parity factor is computed based at least in part on the product. At 406, a selection is made between the first parity factor and the second parity factor. In one embodiment, the first parity factor is a P syndrome and the second parity factor is a Q syndrome as described above. In one embodiment, the second parity factor is further divided by a divisor. In one embodiment, the first parity factor and the second parity factor are buffered. In one embodiment, the first parity factor and the second parity factor are computed in parallel.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus for generating information for reconstructing user data comprising:
   a first comparator to generate a first parity factor based on the user data;
   a multiplier to multiply the user data with a multiplication factor to generate a product;
   a second comparator coupled to the multiplier to generate a second parity factor based at least in part on the product; and
   a selector coupled to the first comparator and the second comparator to choose between the first parity factor and the second parity factor for output as the information for reconstructing the user data.

2. The apparatus of claim 1, wherein the first comparator and the second comparator operate in parallel to generate the first parity factor and the second parity factor.

3. The apparatus of claim 1, further comprising a divider coupled to the second comparator to perform division operations on the second parity factor.

4. The apparatus of claim 1, further comprising a first buffer coupled to the first comparator to store the first parity factor.

5. The apparatus of claim 1, further comprising a second buffer coupled to the second comparator to store the second parity factor.

6. The apparatus of claim 1, wherein the first comparator is an XOR (Exclusive OR) gate.

7. The apparatus of claim 1, wherein the second comparator is an XOR (Exclusive OR) gate.

8. The apparatus of claim 1, wherein the multiplier performs Galois Field multiplication.

9. The apparatus of claim 1, wherein the first comparator generates a RAID (Redundant Array of Independent Disks) syndrome based on the user data, wherein the user data is stored in one or more of the storage blocks.

10. The apparatus of claim 1, wherein the second comparator generates a RAID (Redundant Array of Independent Disks) syndrome based at least in part on the product.

11. A method for generating recovery information comprising:
   computing a first parity factor with a first comparator based on comparing data from one or more storage blocks;
   generating a product by multiplying the data from the one or more of the storage blocks with a multiplication factor;
   computing in parallel with the computing of the first parity factor a second parity factor based at least in part on the product, wherein the second parity factor is computed with a second comparator coupled to received the product;
   outputting the first and second parity factors, and
   dividing the second parity factor by a divisor.

12. The method of claim 11, wherein computing a first parity factor comprises computing a RAID (Redundant Array of Independent Disks) P-Syndrome based on the data from one or more of the storage blocks and wherein computing a second parity factor comprises computing a RAID Q-Syndrome based at least in part on the product.

13. The method of claim 12, wherein computing a RAID Q-Syndrome based at least in part on the product comprises computing a RAID Q-Syndrome based at least in part on a product of a Galois field multiplicand and the data from one or more of the storage blocks.

14. The method of claim 11, further comprising storing the first and second parity factors to storage blocks independent of the storage blocks storing the data.

15. A system comprising:
   one or more storage devices to store data; and
   a recovery device coupled to the one or more storage devices to generate recovery information based on the data, the recovery device including:
   a first comparator to generate a first parity factor based on data on one or more of the storage devices;
   a multiplier to multiply data from one or more of the storage devices with a multiplication factor to generate a product; and
   a second comparator coupled to the multiplier to generate a second parity factor based at least in part on the product,
   wherein the multiplier performs Galois Field multiplication.

16. The system of claim 15, wherein the recovery device further includes a divider coupled to the second comparator.

17. The system of claim 15, wherein the recovery device further includes a selector coupled to the first comparator and the second comparator to choose between the first parity factor and the second parity factor.

18. The system of claim 15, wherein the first comparator generates a first RAID (Redundant Array of Independent Disks) syndrome based on data from one or more of the storage devices and the second comparator generates a second RAID syndrome based at least in part on the product.

19. A method for generating recovery information comprising:
   computing a first parity factor with a first comparator based on comparing data from one or more storage blocks;
   generating a product by multiplying the data from the one or more of the storage blocks with a multiplication factor;
   computing in parallel with the computing of the first parity factor a second parity factor based at least in part on the product, wherein the second parity factor is computed with a second comparator coupled to received the product; and
   outputting the first and second parity factors,
   wherein computing the first parity factor comprises computing a first RAID (Redundant Array of Independent Disks) syndrome based on the data from the one or more of the storage blocks and wherein computing the second parity factor comprises computing a second RAID syndrome based at least in part on the product.

* * * * *